(12) United States Patent
Stovall

(10) Patent No.: US 6,414,758 B1
(45) Date of Patent: *Jul. 2, 2002

(54) HIGH SPEED FACSIMILE TRANSMISSION

(75) Inventor: Gregory Todd Stovall, Garland, TX (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,553

(22) Filed: Dec. 15, 1997

(51) Int. Cl.$^7$ ................................................ H04N 1/00
(52) U.S. Cl. .................................................. 358/434
(58) Field of Search ........................ 358/400, 405, 358/407, 434, 435, 436, 437, 438, 439, 440, 442; 379/100.01, 100.05, 100.06, 100.09, 100.16

(56) References Cited

U.S. PATENT DOCUMENTS

| | | | | |
|---|---|---|---|---|
| 5,289,579 A | * | 2/1994 | Punj | 395/200 |
| 5,418,624 A | * | 5/1995 | Ahmed | 358/435 |
| 5,511,074 A | * | 4/1996 | Lam et al. | 370/84 |
| 5,680,437 A | * | 10/1997 | Segal | 379/10 |
| 5,719,688 A | * | 2/1998 | Kagami | 358/400 |
| 6,229,884 B1 | * | 5/2001 | Toyoda | 379/100.08 |
| 6,259,538 B1 | * | 7/2001 | Amit | 358/442 |

FOREIGN PATENT DOCUMENTS

| | | | |
|---|---|---|---|
| EP | 0382416 | 8/1990 | H04N/1/32 |
| EP | 0461859 | 12/1991 | H04N/1/32 |
| EP | 0714186 | 5/1996 | H04J/3/16 |
| EP | 0798896 | 10/1997 | H04L/12/56 |
| GB | 2290929 | 1/1996 | H04L/25/36 |
| JP | 08-032790 | 2/1996 | H04N/1/32 |

OTHER PUBLICATIONS

McConnel, Kenneth; Facsimile Technical Information Handbook; pp. 36–43.*

Facsimile Technology and Applications Handbook; McConnell, Bodson, Schaphorst (table 3.6); p. 45, 1992.*

International Application Published Under the Patent Cooperation Treaty: WO 96/27975; Sep. 12, 1996; *Facsimile Transmission in a Mobile Communication System*; Rasanen, Juha.

Tomcik, J.D. et al: "Facsimile Compression Through Demodulation in Packet Networks" Institute of Electrical and Electronics Engineers, Dec. 6, 1992, vol. 3, pp. 1699–1703.

* cited by examiner

*Primary Examiner*—Jerome Grant, II
(74) *Attorney, Agent, or Firm*—Carr & Storm, L.L.P.

(57) ABSTRACT

A facsimile document ("fax") from a first fax device is transmitted to a second fax device over a telecommunications network, which may be a public switched telephone network, wherein the first fax device is coupled to the telecommunications network by a high speed connection adaptable for carrying transmissions at speeds higher than a 64 Kbps voice grade connection. The first and second fax devices are coupled to the telecommunications network by a high speed connection, which may be ATM connections or ISDN connections.

11 Claims, 2 Drawing Sheets

HIGH SPEED FACSIMILE TRANSMISSION

TECHNICAL FIELD

The present invention relates in general to telecommunications, and in particular, to facsimile transmissions over a network.

BACKGROUND INFORMATION

The use of facsimile ("fax") transmissions has become such an important part of doing business that it is a wonder commerce was ever able to do without fax machines. The ever evolving and growing world economy requires the fax machine to transmit documents around the world. There is a need to further increase the speed of fax transmissions. The speed at which documents can be sent by a facsimile transmission is limited by two main factors:

(1) the speed at which a fax machine can scan in a document, and (2) the speed at which the facsimile transmission can be transferred over the public switched telephone network ("PSTN").

Increasing the speed of either of these two factors would be very desirable, especially in those instances where a large number of pages are being faxed at any one time. One means of increasing the speed is direct faxing from a desktop computer. This significantly speeds the process by eliminating the need to scan the document. However, the transmission of the document to the remote fax machine is still limited by the transmission speed.

Therefore, there remains a need for more quickly transmitting faxes over the PSTN.

SUMMARY OF THE INVENTION

The foregoing need is addressed by the present invention, which provides a high-speed fax machine for transmitting documents at faster transmission rates when both the sending and receiving fax transmission devices are connected to a PSTN with higher speed connections, such as ISDN or ATM (asynchronous transfer mode). A functionality is provided by the present invention whereby the fax transmission device, which is connected to the PSTN by the higher speed connection, determines whether the remote fax transmission device is also connected to the PSTN by a higher speed connection. If such a determination is made, then the fax transmission is made at the higher transmission speed provided by the high speed connections. Such a higher transmission rate may result in a direct digital transmission between the two fax devices.

The present invention is not limited to the application of fax devices, but may be applied to any telecommunications device transmitting information over a network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
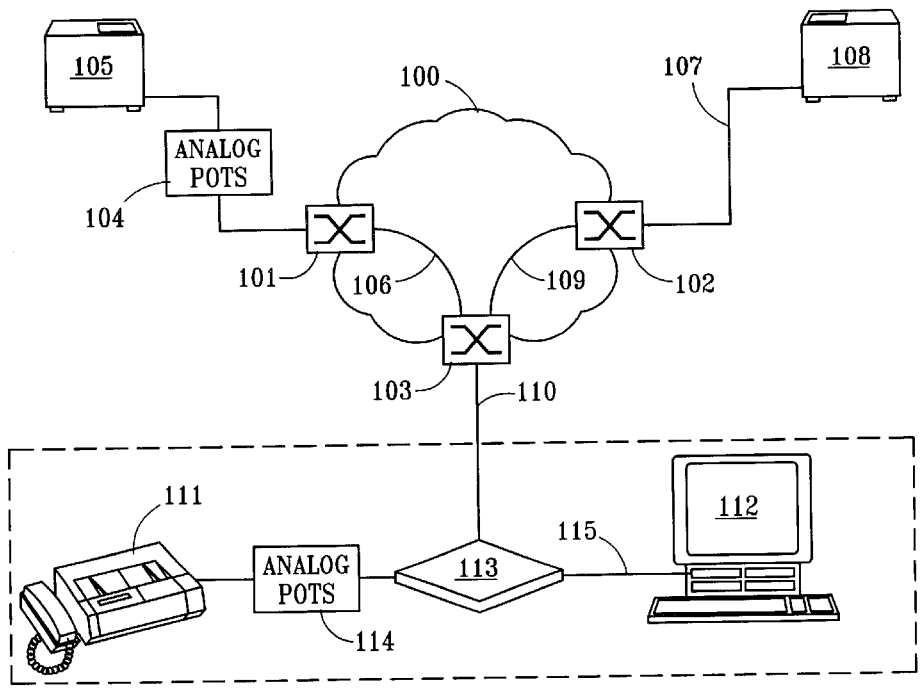
FIG. 1 illustrates an implementation of the present invention over a PSTN.

Referring to FIG. 1, there is illustrated xDSL multiplexer 113, which is a high-speed network access device for providing a high speed connection over the PSTN 100 to a device capable for transmitting high-speed data. Multiplexer 113 packages voice and data traffic onto a single pair of wires. Exemplary xDSL multiplexers may be obtained from Westell or Alcatel.

For purposes of the present invention, the high speed connections described herein may be ATM (asynchronous transfer mode), ISDN, ethernet, or any other media capable of transmitting data at speeds higher than capable on an analog telephone line (typically 64 Kbps). The xDSL multiplexer 113 may be an asymmetric digital subscriber line multiplexer ADSL ("A" replaces the "x" to denote any of several competing level 2 protocols performing the same function). The xDSL multiplexer 113 provides the ability to connect an analog telephone 111 (also known as a POTS, or plain old telephone set) by an analog connection 114 to PSTN 100. However, for purposes of the present invention, the remainder of the discussion will be with respect to the ability of xDSL multiplexer 113 providing the capability for a high speed fax machine to make high speed transmissions over PSTN 100 to a remote high speed fax machine, wherein high speed is any speed (bandwidth) greater than 64 Kbps.

In FIG. 1, personal computer 112 represents a high speed fax machine, or a general purpose computer running a fax program, and connected to the XDSL multiplexer 113 by high speed connection 115. The XDSL multiplexer 113 is also connected by high speed connection 110 to central office 103. Central office 103 is connected by connection 109 within PSTN 100 to central office 102, and is connected by connection 106 within PSTN 100 to central office 101. PSTN 100 may be any telecommunications network capable of high speed transmissions, and central offices 101–103 may be appropriate connections.

Central office 101 is connected to fax machine 105 by connection 104, while central office 102 is connected by high speed connection 107 to high speed fax machine 108. For purposes of this discussion, references to a fax machine will naturally include any device capable of sending and receiving facsimile transmissions.

Figure 2:
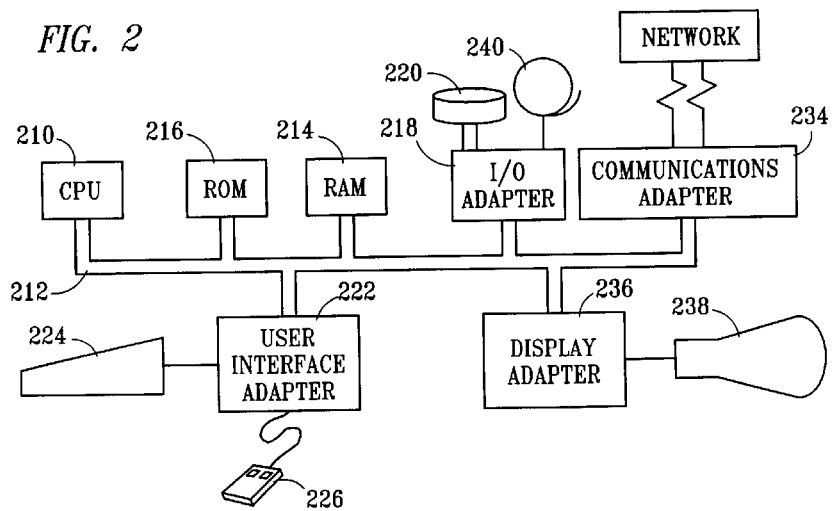
FIG. 2 illustrates hardware that may be implemented to operate the present invention.

A representative hardware environment for practicing the present invention is depicted in FIG. 2, which illustrates a typical hardware configuration of a processing system having central processing unit (CPU) 210, such as a conventional microprocessor, and a number of other units interconnected via system bus 212. The system may include random access memory (RAM) 214, read only memory (ROM) 216, and input/output (I/O) adapter 218 for connecting peripheral devices such as disk units 220 and tape drives 240 to bus 212. Also included are user interface adapter 222 for connecting keyboard 224, mouse 226, and/or other user interface devices such as a touch screen device (not shown) to bus 212, communication adapter 234 for connecting the system to a data processing network, and display adapter 236 for connecting bus 212 to display device 238. CPU 210 may include other circuitry not shown herein, which will include circuitry commonly found within a microprocessor, e.g., execution unit, bus interface unit, arithmetic logic unit, etc. The present invention is preferably embodied in software, as described in FIG. 3, and executed on the hardware described in FIG. 2. The present invention may be implemented within any one of devices 108, 112, or 113.

Figure 3:
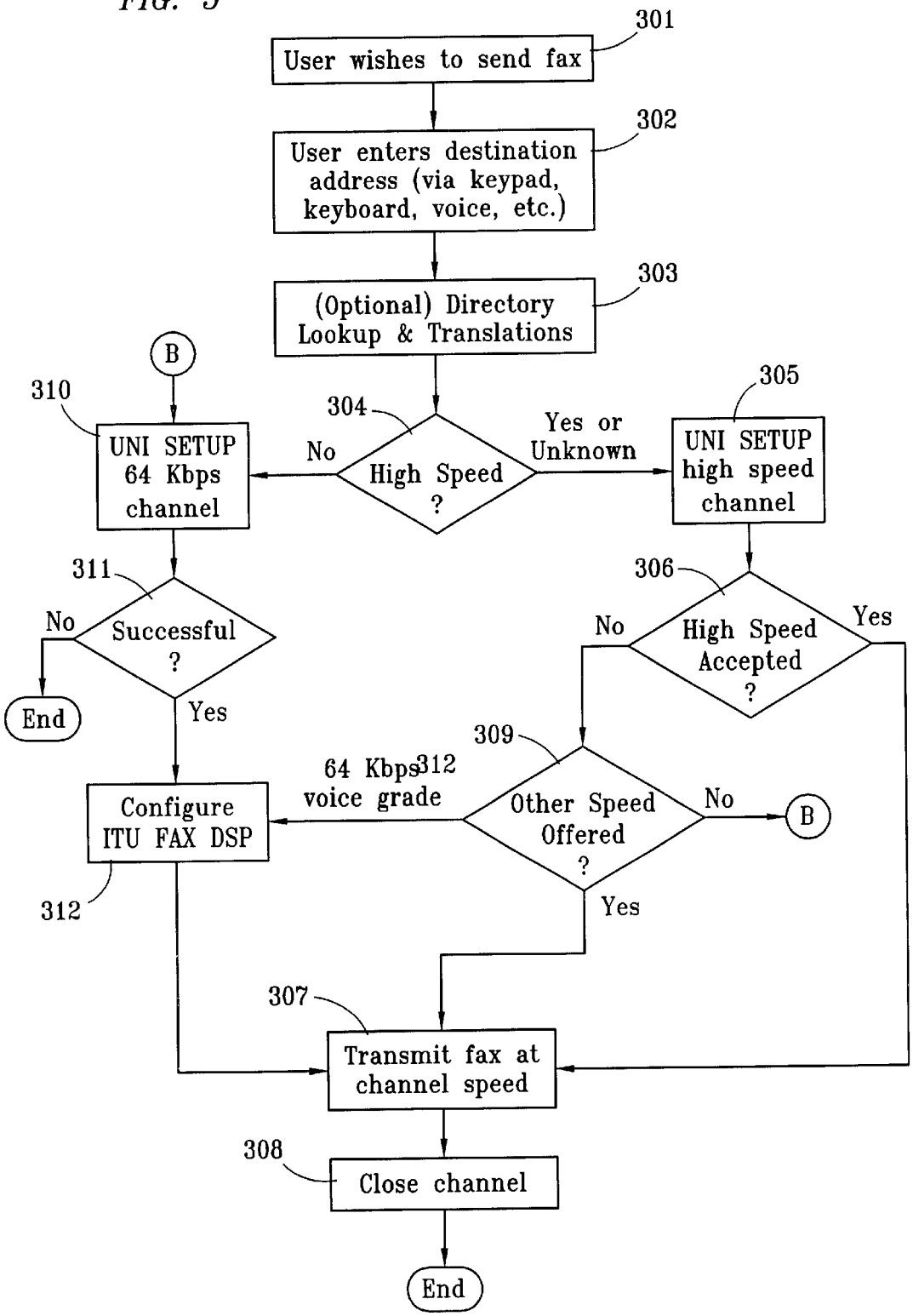
FIG. 3 illustrates a flow diagram of an embodiment of the present invention.

Referring next to FIG. 3, there is illustrated a flow diagram of a process implemented within fax device 112. In step 301, a user, or process implemented within fax device 112, begins the process for sending a fax. In step 302, the user, or a process running on fax device 112, enters a destination address, which may be a telephone number, a name, or an Internet address if the facsimile transmission is to be sent over the Internet. The destination address may be an E164 address, which is an ITU specification for phone numbers, etc.

Thereafter, in step 303, an optional process may be performed whereby a directory look-up and a translation is performed in order to retrieve the desired telephone number, or destination address, from memory. This may be implemented in a process whereby a user enters the name of the destination, and the destination address is retrieved in response.

Thereafter, in step 304, fax device 112 determines whether to do a high-speed or low-speed UNI setup. This determination may be the result of a directory lookup (local directory or a well-known external directory service). If the response is "low-speed" then the fax device 112 will presume that the connection is 64 Kbps voice band connection. If the response is a particular "high-speed," then that rate or a rate between that and 64 Kbps will be attempted. If the directory lookup does not return any bandwidth indication, then fax device 112 is free to do as it wishes. Fax device 112 could be configured to default to either low-speed or high-speed for such an information condition. Note that a default decision to the high-speed case still provides the opportunity for fax device 112 to fall back to a low-speed connection if the higher speed does not prove to be possible.

If the connection is a high-speed connection, then the process proceeds to step 305. Note that the process in FIG. 3 may be programmed so that step 305 follows step 304 even if in step 304 it cannot be determined whether or not connection 110 is a high-speed connection.

In step 305, the remote fax machine 105 or 108 is called and a negotiation is entered into between fax device 112 and the remote fax machine 105 or 108. This negotiation may be a UNI SETUP (ATM Forum's User-Network Interface Specification, Version 3.1 (UNI 3.1)), a Q.2931 (ITU Specification Q.2931), or TCP/IP (Transmission Control Protocol/Internet Protocol) bandwidth negotiation. As an example of a UNI negotiation, a first step is for the originator of the proposed communication to send a SETUP message asking for a specified bandwidth using typical ATM Adaptation Layer (AAL) parameters. In response, the terminator or receiver of the proposed fax communication, has the option of either (a) sending a REJECT response if it cannot accept the request, (b) sending a CONNECT response if it can accept the request, or (c) sending a CONNECT response with a different bandwidth offering if it desires some other bandwidth than offered by the originator. The CONNECT message is a UNI or Q.2931 message that is sent from the destination to the xDSL multiplexer 113 to indicate that the connection has been successfully established. If the AAL parameters indicate a connection that is a higher speed than a 64 Kbps voice connection, then the connection is considered to be a "high-speed" connection, even if it is not quite as much bandwidth as desired. In response thereto, the originating fax machine may in response to the REJECT response, either (a) accept the rejection and report an error to the user of the originating fax machine, or (b) send another SETUP message with a different set of connection parameters to the other fax machine. The originating fax machine may, in response to a CONNECT response from the terminating fax machine, either (a) use the bandwidth requested and for which the CONNECT response was received, or (b) if the connection will not be using the original bandwidth desired, then the originating fax machine may DISCONNECT the connection and either report an error or try a different bandwidth specification or accept and use the connection with the different bandwidth responded by the terminating fax machine. In addition, if the channel specifications returned indicate an audio channel, then a DSP (digital signal processor) or DSP function (in the case of a high performance general purpose computer) is activated within the originating fax machine.

In the initial SETUP message (and the CONNECT response) between fax device 112 and fax machine 105 or 108, several UNI information elements ("IEs") participate in negotiating the characteristics of the channel to be established between the devices. One of these may be the ATM Adaptation Layer IE. In this element, the calling party sends its desired connection parameters, such as bit rates, AAL types and sub-types, e.g., 64 Kbps voice-band, high-quality audio, video, circuit emulation. The called party may reject the requested set, or it may offer its own.

For example, if an ATM attached fax machine were to call an analog fax machine, it might originally request a 1544 Kbps circuit emulation channel. The phone switch controlling the analog fax machine could either reject this SETUP attempt, or it could accept the connection, but specify that the channel is only of a 64 Kbps voice-band quality. The calling party could then either use or RELEASE the offered channel.

An analog fax machine calling an ATM attached fax machine would be represented by the phone switch over an ISDN-like translation function. The Q.2931 SETUP message to the ATM fax would specify a 64 Kbps voice-band channel. The ATM fax would understand this to be an analog fax, would switch a DSP (digital signal processor) or DSP function into the call, and would respond with a matching CONNECT.

Essentially, in step 305, fax device 112 will attempt to make a high-speed connection. If the receiving fax machine 108 accepts the high-speed connection in step 306, then the process proceeds to step 307 to transmit the facsimile transmission at the selected channel speed. After the transmission is completed, the channel is closed in step 308. This would occur if the facsimile transmission was to occur between fax device 112 and fax machine 108 over connections 107, 109, and 110 and digital switches 102 and 103. Such a higher speed would be possible since fax device 112 has been able to recognize that fax machine 108 is connected to PSTN 100 by ATM connection 107 and is thus capable of a direct digital transmission of the fax.

However, if the facsimile transmission is to occur between devices 112 and 105 and connection 104 is not capable of a direct digital transmission, the process would proceed to step 309 to determine whether or not there is another lower speed capable between devices 112 and 105. If there is a lower speed available, then the process proceeds to step 307 to transmit the fax at that speed. Such a lower speed could be any desired speed between the speed originally requested by device 112 and a 64 Kbps voice grade connection (e.g., connection 104 is an ISDN connection).

For example, suppose that device 112 desired to send the fax at 10 Mbps, but the only bandwidth that device 105 could handle was 1 Mbps, then device 105 might offer 1 Mbps to device 112. Furthermore, in some circumstances, it might even be reasonable for device 105 to respond to a rate below the 64 Kbps nominal network audio rate. For example, this may occur where the tariffs on network connections are expensive when leasing lines from the government Telco (e.g., in Europe); then it may make sense to run the transmission at subrate (V. 17 (14.4 Kbps)) speeds in the network, adapting to 64 Kbps analog voice connections only at the last stage in the network before the terminating device.

The process proceeds from step 309 to step 312 when the CONNECT message is returned by the terminating fax device with an offer of a 64 Kbps voice grade circuit (e.g., connection 104 is an analog POTS line).

The connection from step 309 to step 310 is taken when the requested high speed connection has been REJECTed, and the originating device 112 decides to attempt a UNI or Q.2931 SETUP with a 64 Kbps voice grade circuit in step 310.

In step 310, a UNI SETUP negotiation is attempted in order to transmit the fax over a typical 64 Kbps channel. If the negotiation is successful in step 311, then in step 312 the ITU fax DSP is configured and the fax is transmitted at 64 Kbps in step 307.

Although the present invention and its advantages have been described in detail, it should be understood that various changes, substitutions and alterations can be made herein without departing from the spirit and scope of the invention as defined by the appended claims.

What is claimed is:

1. A method for transmitting a facsimile from a first facsimile device to a second facsimile device over a network, said method being characterized by the steps of:
    negotiating by the first facsimile device via digital message protocols with the network a first proposed bandwidth for the digital transmission of data from the first facsimile device over a single digital channel to the second facsimile device;
    determining by the network via digital message protocols with the second facsimile device whether the first proposed bandwidth is acceptable to the second facsimile device;
    upon a determination that the first proposed bandwidth is acceptable to the second facsimile device, communicating from the network via digital message protocols to the first facsimile device that the first proposed bandwidth will constitute the negotiated bandwidth for the digital transmission of data from the first facsimile device over the single channel to the second facsimile device, and transmitting the facsimile from the first facsimile device via the single channel to the second facsimile device at substantially the negotiated bandwidth;
    upon a determination that the first proposed bandwidth is not acceptable to the second facsimile device, negotiating by the second facsimile device via digital message protocols with the network a second proposed bandwidth for the digital transmission of data from the first facsimile device over a single channel to the second facsimile device;
    determining by the network via digital message protocols with the first facsimile device whether the second proposed bandwidth is acceptable to the first facsimile device; and
    upon a determination that the second proposed bandwidth is acceptable to the first facsimile device, transmitting the facsimile from the first facsimile device via the single channel to the second facsimile device at substantially the negotiated bandwidth.

2. The method as recited in claim 1, wherein the digital transmission of data is direct digital transmission of data, and the single digital data channel is a single direct digital data transmission channel.

3. The method as recited in claim 1, wherein the steps of negotiating are performed over at least one signaling channel interconnecting the first and second facsimile devices to the network.

4. The method as recited in claim 1, wherein the negotiated bandwidth exceeds 64 Kbps.

5. The method as recited in claim 1, further comprising:
    coupling the first facsimile device to the network via a first high speed connection comprising an Ethernet connection, an ATM connection, or an ISDN connection, wherein the first high speed connection is overlaid by a UNI, ISDN, B-ISDN, IP, and/or ATM protocol stack; and
    coupling the second facsimile device to the network via a second high speed connection comprising an Ethernet connection, an ATM connection, or an ISDN connection, wherein the second high speed connection is overlaid by a UNI, ISDN, B-ISDN, IP, and/or ATM protocol stack.

6. The method as recited in claim 1, wherein the network is a public switched telephone network (PSTN).

7. The method as recited in claim 1, wherein the second proposed bandwidth is less than the first proposed bandwidth, but greater than 64 Kbps.

8. The method as recited in claim 1, wherein the negotiated bandwidth is a 64 Kbps connection.

9. The method as recited in claim 1, further comprising:
    coupling the first facsimile device to the network via a first high speed connection comprising an Ethernet connection, an ATM connection, or an ISDN connection, wherein the first high speed connection is overlaid by a UNI, ISDN, B-ISDN, IP, and/or ATM protocol stack, wherein the first high speed connection is adaptable for carrying transmissions at speeds exceeding a 64 Kbps voice grade connection; and
    coupling the second facsimile device to the network via a second high speed connection comprising an Ethernet connection, an ATM connection, or an ISDN connection, wherein the second high speed connection is overlaid by a UNI, ISDN, B-ISDN, IP, and/or ATM protocol stack, wherein the second high speed connection is adaptable for carrying transmissions at speeds exceeding a 64 Kbps-voice grade connection.

10. The method as recited in claim 1, wherein the negotiated bandwidth is less than or equal to 64 Kbps.

11. The method as recited in claim 1, wherein the network is a telecommunications network.

* * * * *